(12) United States Patent
Bharati et al.

(10) Patent No.: US 11,042,583 B2
(45) Date of Patent: Jun. 22, 2021

(54) SYSTEMS AND METHODS FOR REAL-TIME MULTI-PARTY RECOMMENDATION IN A PEER TO PEER COMMUNICATION

(71) Applicant: RELIANCE JIO INFOCOMM LIMITED, Mumbai (IN)

(72) Inventors: Sumir Bharati, Navi Mumbai (IN); Mayank Kapoor, Navi Mumbai (IN); Anil Chaudhry, Navi Mumbai (IN); Nagappan Arunachalam, Navi Mumbai (IN); Pawnita Malhotra, Navi Mumbai (IN)

(73) Assignee: RELIANCE JIO INFOCOMM LIMITED, Maharashtra (IN)

( * ) Notice: Subject to any disclaimer, the term of this patent is extended or adjusted under 35 U.S.C. 154(b) by 180 days.

(21) Appl. No.: 16/009,111

(22) Filed: Jun. 14, 2018

(65) Prior Publication Data
US 2018/0365239 A1  Dec. 20, 2018

(30) Foreign Application Priority Data

Jun. 19, 2017 (IN) .............................. 201721021444

(51) Int. Cl.
*G06F 16/00* (2019.01)
*G06F 16/435* (2019.01)
*H04L 29/08* (2006.01)
*G06F 16/48* (2019.01)

(52) U.S. Cl.
CPC ............ *G06F 16/435* (2019.01); *G06F 16/48* (2019.01); *H04L 67/104* (2013.01)

(58) Field of Classification Search
CPC ....... G06F 16/435; G06F 16/48; H04L 67/104
See application file for complete search history.

(56) References Cited

U.S. PATENT DOCUMENTS

| | | | | | |
|---|---|---|---|---|---|
| 6,438,579 | B1* | 8/2002 | Hosken | ................. | G06Q 30/02 709/203 |
| 8,180,765 | B2* | 5/2012 | Nicolov | ............. | G06Q 30/0202 707/722 |
| 8,329,412 | B2* | 12/2012 | Chau | ...................... | C07K 14/47 435/183 |
| 8,356,038 | B2* | 1/2013 | Torrens | .................. | G06Q 30/02 707/749 |

(Continued)

*Primary Examiner* — Hung Q Pham
(74) *Attorney, Agent, or Firm* — Ladas & Parry, LLP (57) ABSTRACT

The present invention relates to systems and methods for real-time multi-party recommendation in a peer to peer communication. The system (200) comprises a transceiver (202) that receives a selection for selecting a first electronic media from a first set of electronic media stored in the first user equipment (102), and transmit the same to the second user equipment (104). The system (200) further comprises a metadata generator unit (204) to generate first electronic media metadata; and a recommendation unit (206) to determine first recommendation metadata based on an analysis of first electronic media metadata and a first set of electronic media metadata. The transceiver (202) of the system (200) transmits the first electronic media metadata and the first recommendation metadata to the second user equipment (104), and receives, a second recommendation metadata based on an analysis of the first electronic media metadata and a second set of electronic media metadata.

11 Claims, 4 Drawing Sheets

(56) References Cited

U.S. PATENT DOCUMENTS

| | | | | |
|---|---|---|---|---|
| 8,639,706 B1* | 1/2014 | Bilinski | ............... | H04L 51/10 |
| | | | | 707/752 |
| 8,825,574 B2* | 9/2014 | Bodor | ............... | G06F 16/40 |
| | | | | 706/18 |
| 9,047,298 B2* | 6/2015 | Agrawal | ............... | G06F 16/14 |
| 9,531,823 B1* | 12/2016 | Suchland | ............ | H04W 4/023 |
| 9,652,481 B2* | 5/2017 | Bachman | ............ | G06Q 30/02 |
| 9,940,401 B2* | 4/2018 | Gang | ............... | G06F 16/954 |
| 9,952,748 B1* | 4/2018 | Lewis | ............... | H04N 21/252 |
| 2008/0052371 A1* | 2/2008 | Partovi | ............... | G06Q 10/10 |
| | | | | 709/217 |
| 2008/0168140 A1* | 7/2008 | Chen | ............... | G06F 21/6218 |
| | | | | 709/205 |
| 2008/0250312 A1* | 10/2008 | Curtis | ............... | G06Q 10/00 |
| | | | | 715/700 |
| 2009/0049045 A1* | 2/2009 | Askey | ............... | G06F 16/639 |
| 2009/0055377 A1* | 2/2009 | Hedge | ............... | G06F 16/4387 |
| 2009/0077220 A1* | 3/2009 | Svendsen | ............ | H04N 7/00 |
| | | | | 709/224 |
| 2009/0083117 A1* | 3/2009 | Svendsen | ............ | H04L 67/30 |
| | | | | 709/205 |
| 2010/0037752 A1* | 2/2010 | Hansson | ............ | G06F 16/639 |
| | | | | 84/601 |
| 2010/0274782 A1* | 10/2010 | Barbierei | ............ | G06F 16/68 |
| | | | | 707/723 |
| 2013/0151462 A1* | 6/2013 | Ledlie | ............... | G06Q 10/10 |
| | | | | 706/54 |
| 2014/0040760 A1* | 2/2014 | Randell | ............... | G06F 16/435 |
| | | | | 715/745 |
| 2014/0089967 A1* | 3/2014 | Mandalia | ............ | H04N 21/435 |
| | | | | 725/34 |
| 2015/0319206 A1* | 11/2015 | Sanghavi | ............ | H04L 65/4084 |
| | | | | 709/204 |
| 2016/0239547 A1* | 8/2016 | Lim | ............... | G06F 3/04842 |

* cited by examiner

SYSTEMS AND METHODS FOR REAL-TIME MULTI-PARTY RECOMMENDATION IN A PEER TO PEER COMMUNICATION

CROSS REFERENCE TO RELATED APPLICATION

This application claims the benefit of and priority to the Indian Patent Application No. 201721021444 filed on Jun. 19, 2017, the disclosure of which is hereby incorporated herein by reference in its entirety.

TECHNICAL FIELD

Embodiments of the present invention generally relate to peer to peer communication between electronic devices and more particularly to systems and methods for real-time multi-party recommendation in a peer to peer communication between electronic devices.

BACKGROUND

In recent years there has been extensive use of consumer electronic devices. Many consumer electronic devices such as mobile devices, smartphones, personal digital assistants, laptops, tablets, etc. are widely used for both personal and business purposes. The extensive use of electronic devices has resulted in an increased need to transfer content stored on one electronic device to another electronic device, wherein content includes applications or data. Various mechanisms of such content transfer have therefore been developed. While such transfer mechanisms are able to transfer content selected to be shared by the user of the electronic devices, they do not provide for improved recommendations of content transfer. For instance, when a content is transferred from a first device to a second device, the user of the second device is unable to know if there is any other content on the first device that may be recommended or may be of interest for the user of the second device. Similarly, the user of the first device is also unable to know if there is any content on the second device that may be recommended or may be of interest to the first user. In the existing scenario, user intervention is necessary for providing such recommendations, i.e. the users of the first and second devices are required to manually recommend to each other content that can be transferred from the first device to the second device and vice versa. Further, when content is transferred from the first device to the second device, there is no existing transfer mechanism that provides for automatic recommendation of content already stored on the first device or the second device, based on user profile and likings. Therefore, there exists a need in the art for providing a solution to the above-mentioned limitations and drawbacks of the existing transfer mechanisms.

SUMMARY

This section is provided to introduce certain aspects of the present invention in a simplified form that are further described below in the detailed description. This summary is not intended to identify the key features or the scope of the claimed subject matter.

In view of the afore-mentioned drawbacks and limitations of the prior art, it is an object of the present invention to provide methods and systems for real-time multi-party recommendation of content in a peer to peer communication. Another object of the invention is to provide methods and systems for real-time multi-party recommendation of content without the explicit control or manual intervention of the users. Yet another object of the invention is to provide methods and systems for real-time multi-party recommendation of content from a first electronic device to a second electronic device based on the profile of the user of the second electronic device.

In view of these and other objects, one aspect of the present invention may relate to a method for real-time multi-party recommendation in a peer to peer communication. The method comprises receiving, at a first user equipment, a selection for selecting at least one first electronic media from a first set of electronic media, wherein the at least one first electronic media and the first set of electronic media are stored in the first user equipment. Subsequently, said at least one first electronic media is transmitted by the first user equipment to the second user equipment. The method then includes generating, by the first user equipment, at least one first electronic media metadata, wherein the at least one first electronic media metadata corresponds to the at least one first electronic media. Based on an analysis of the at least one first electronic media metadata and a first set of electronic media metadata, the method includes determining, by the first user equipment, at least one first recommendation metadata, wherein the at least one first recommendation metadata corresponds to at least one of the first set of electronic media and the first set of electronic media metadata corresponds to the first set of electronic media. Thereafter, the method includes transmitting the at least one first electronic media metadata and the at least one first recommendation metadata by the first user equipment to the second user equipment; and receiving, by the first user equipment, at least one second recommendation metadata from the second user equipment based on an analysis of the at least one first electronic media metadata and a second set of electronic media metadata. This second set of electronic media metadata corresponds to a second set of electronic media stored at the second user equipment, and the at least one second recommendation metadata corresponds to at least one of the second set of electronic media.

Another aspect of the invention may relate to a system for real-time multi-party recommendation in a peer to peer communication, the system comprising: a transceiver configured to receive, by a first user equipment, a selection for selecting at least one first electronic media from a first set of electronic media, wherein the at least one first electronic media and the first set of electronic media are stored in the first user equipment, and transmit, by the first user equipment, said at least one first electronic media to the second user equipment. The system further comprises a metadata generator unit configured to generate, by the first user equipment, at least one first electronic media metadata, wherein the at least one first electronic media metadata corresponds to the at least one first electronic media. Further, the system comprises a recommendation unit configured to determine, by the first user equipment, at least one first recommendation metadata based on an analysis of the at least one first electronic media metadata and a first set of electronic media metadata, wherein the at least one first recommendation metadata corresponds to at least one of the first set of electronic media and the first set of electronic media metadata corresponds to the first set of electronic media. The transceiver of the system is also configured to transmit, by the first user equipment, at least one of the at least one first electronic media metadata and the at least one first recommendation metadata to the second user equipment, and receive, by the first user equipment, at least one second recommendation metadata from the second user equipment based on an analysis of the at least one first electronic media metadata and a second set of electronic media metadata, wherein the second set of electronic media metadata corresponds to a second set of electronic media stored at the second user equipment, and the at least one second recommendation metadata corresponds to at least one of the second set of electronic media.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes disclosure of electrical components or circuitry commonly used to implement such components. The connections between the sub-components of a component have not been shown in the drawings for the sake of clarity, therefore, all sub-components shall be assumed to be connected to each other unless explicitly otherwise stated in the disclosure herein.

The foregoing shall be more apparent from the following more detailed description of the embodiments of the present invention.

DETAILED DESCRIPTION

In the following description, for the purposes of explanation, various specific details are set forth in order to provide a thorough understanding of embodiments of the present invention. It will be apparent, however, that embodiments of the present invention may be practiced without these specific details. Several features described hereafter can each be used independently of one another or with any combination of other features. An individual feature may not address any of the problems discussed above or might address only one of the problems discussed above.

The present invention encompasses systems and methods for real-time multi-party recommendation in a peer-to-peer communication between electronic devices. The invention encompasses exchange of electronic media between devices and recommendation of content based on such electronic media being exchanged, wherein such recommendation occurs without any manual intervention of the users of the devices.

As used herein, "hardware" includes a combination of discrete components, an integrated circuit, an application specific integrated circuit, a field programmable gate array, other programmable logic devices and/or other suitable hardware as may be obvious to a person skilled in the art.

As used herein, "software" includes one or more objects, agents, threads, lines of code, subroutines, separate software applications, or other suitable software structures as may be obvious to a skilled person. In one embodiment, software can include one or more lines of code or other suitable software structures operating in a general-purpose software application, such as an operating system, and one or more lines of code or other suitable software structures operating in a specific purpose software application.

As used herein, "couple" and its cognate terms, such as "couples" and "coupled" includes a physical connection (such as a conductor), a virtual connection (such as through randomly assigned memory locations of data memory device), a logical connection (such as through logical gates of semiconducting device), other suitable connections, or a combination of such connections, as may be obvious to a skilled person.

Figure 1:
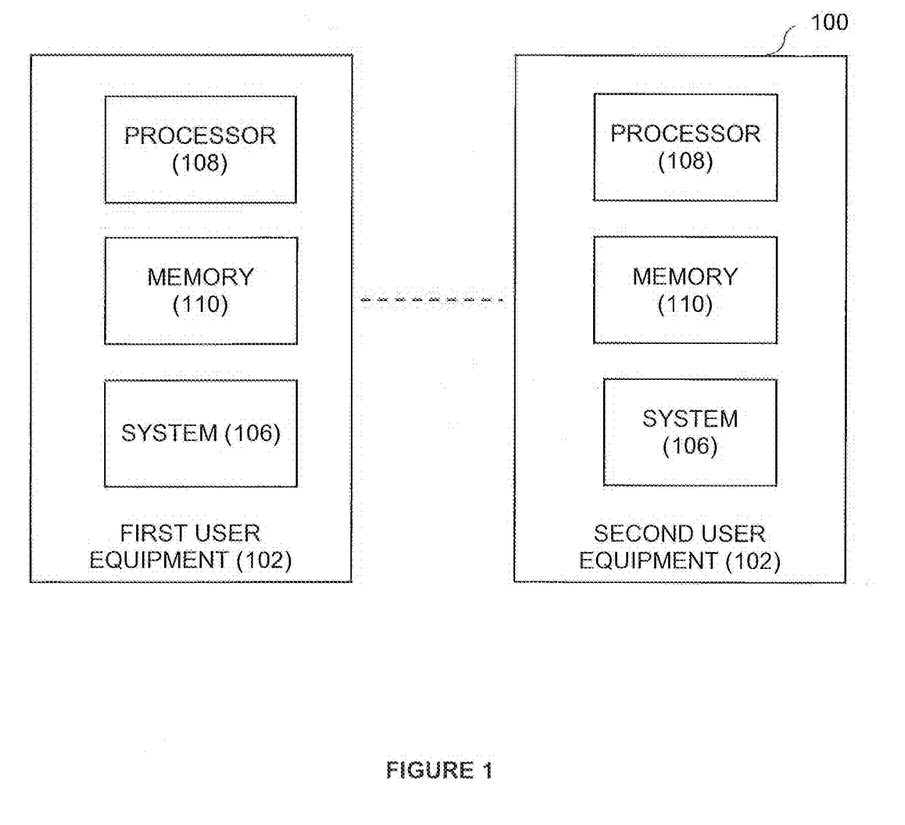
FIG. 1 illustrates a network environment diagram in which the systems and methods for real-time multi-party recommendation in a peer to peer communication is implemented in accordance with exemplary embodiments of the present disclosure.

FIG. 1 illustrates an exemplary network environment diagram in which the systems and methods for real-time multi-party recommendation in a peer to peer communication is implemented in accordance with exemplary embodiments of the present disclosure. As shown in FIG. 1, the network environment comprises a first user equipment 102 and a second user equipment 104 capable of connecting to each other in a peer-to-peer network and sharing data, content or information without any intervention or requirement of a third device or server.

The first user equipment 102 and the second user equipment 104 each comprises of a processor 108, a memory 110 and a system for real-time multi-party recommendation 106. As used herein, a "user equipment" refers to any electrical, electronic, electromechanical and computing device or equipment. In one embodiment of the present invention, the first user equipment and the second user equipment are mobile devices connected via wireless medium, such as radio channel medium for communicating with each other. User equipment may include, but not limited to, a mobile phone, smart phone, pager, laptop, a general purpose computer, desktop, personal digital assistant, tablet computer, mainframe computer, or any other computing device as may be obvious to a person skilled in the art.

The processor 108 is configured to perform signal coding data processing, input/output processing, and/or any other functionality that enables the working of the system 106 in accordance with the present disclosure. Among other capabilities, the processor 108 is also configured to fetch and execute computer-readable instructions and data stored in the memory 110. As used herein, a "processor" refers to any logic circuitry for processing instructions. A processor may be a general-purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), etc.

The memory 110 is configured to store instructions, any number of pieces of information, and data, used by a system 106 to implement the functions of the system 106. The memory 110 is further configured to store the operating system of the user equipment. As used herein, a "memory" or "repository" refers to any non-transitory media that stores data and/or instructions that cause a machine to operate in a specific manner. The invention encompasses a memory, wherein the memory includes a volatile memory or a non-volatile memory. Non-volatile memory includes, for example, a storage device such as magnetic disk, optical disk, solid state drives, or any other storage device for storing information and instructions. Volatile memory includes, for example, a dynamic memory. The invention further encompasses a memory, wherein the memory is single or multiple, coupled or independent, and encompasses other variations and options of implementation as may be obvious to a person skilled in the art.

The processor 108, memory 110 and system 106 are interconnected to each other, for example, using a communication bus. The "communication bus" or a "bus" includes hardware, software and communication protocol used by the bus to facilitate transfer of data and/or instructions. The communication bus facilitates transfer of data, information and content between these components.

The first user equipment 102 is configured to store a first set of electronic media and the second user equipment 104 is configured to store a second set of electronic media. As used herein, "electronic media" refers to data and software applications stored or contained in a user equipment, wherein electronic media includes native data, native applications and any data or software applications downloaded and/or installed from a third-party database or server. Data may be in the form of video file, an audio file, a text file, an image file, a text message, an instant message, at least one call log, at least one contact, and at least one calendar data, gifs, multimedia data, or any combination thereof. Further, electronic media may be in the form of packets, bits, messages, or any other communication element. Transfer or transmission of electronic media includes transfer or transmission of packets, messages, bits, or any other communication element.

As used herein, a "native application" refers to any application software that is pre-installed, or downloaded and installed, in a user equipment. Native applications include, but is not limited to, contact management application, calendar application, messaging applications, image and/or video modification and viewing applications, gaming applications, navigational applications, office applications, business applications, educational applications, health and fitness applications, medical applications, financial applications, social networking applications, and any other applications. Further, as used herein, "native data" refers to data created, modified or installed in a user equipment over time. Native data includes, but is not limited to, contacts, calendar entries, call logs, SMS, images, videos, factory data, and data associated with one or more native applications.

As used herein, a "set" refers to a collection of electronic media. A set may refer to a set of one or more electronic media. In an embodiment, the set of electronic media refers to all the electronic media stored or contained in a user equipment. A set may also refer to a null set i.e. a set that does not contain any electronic media. Electronic media in a set may be related or unrelated to other media in the same set.

The first user equipment 102 and the second user equipment 104 may operate on the same or different operating systems. For example, the operating system on which the user equipment operate may be the Android OS, the Apple iOS, Blackberry OS, Symbian, Web OS, Windows Phone OS, etc. Although processor 108 and memory 110 for both the first user equipment 102 and second user equipment 104 have been shown using the same reference numerals, however it will be appreciated by those skilled in the art that the processor and memory of the first user equipment 102 and second user equipment 104 may have same or different capabilities, functionality and technical specifications. Similarly, the system 106 as shown in the first user equipment 102 and second user equipment 104 may perform slightly different operations during the exchange of electronic media, as shall be apparent from the disclosure of the embodiments of the system and method of the invention.

Although only two user equipment are shown in FIG. 1, the system 106 may be implemented in any number of user equipment. Further, the system 106 stored in one user equipment is capable of forming multiple peer to peer connections with multiple other user equipment simultaneously, and therefore, also capable of transmitting and recommending electronic media to multiple user equipment over separate connections simultaneously.

Figure 2:
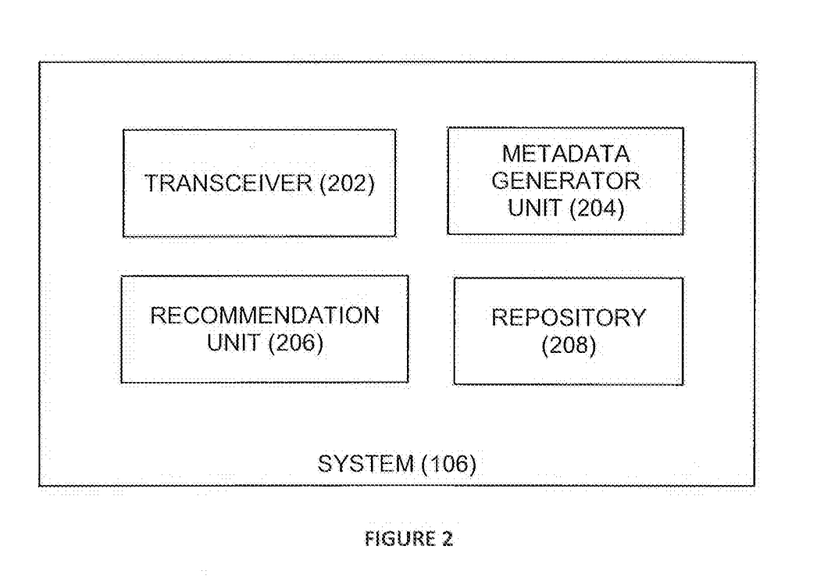
FIG. 2 illustrates a block diagram for the system for real-time multi-party recommendation in a peer to peer communication, in accordance with exemplary embodiments of the present disclosure.

FIG. 2 illustrates a block diagram for the system for real-time multi-party recommendation in a peer to peer communication, in accordance with exemplary embodiments of the present disclosure. As shown in FIG. 2, the system 106 comprises at least of a transceiver 202, a metadata generator 204, a recommendation unit 206 and a repository 208, wherein all the components of the system 106 are interconnected to each other and are capable of exchanging information, data and electronic media. The system 106 as described herein below with reference to FIG. 2 is stored on the first user equipment 102.

The transceiver 202 is configured to discover the second user equipment 104 and establish a connection with the second user equipment 104. The details of such discovery and connections is explained in detail with reference to FIG. 2. The transceiver 202 is further configured to receive, by the first user equipment 102, a selection for selecting at least one first electronic media from a first set of electronic media, wherein the at least one first electronic media and the first set of electronic media are stored in the first user equipment 102. In an embodiment, the first electronic media and the first set of electronic media are stored in the memory 110 of the first user equipment 102. The transceiver 202 is configured to retrieve the first electronic media from the repository 208 and transmit the same to the second user equipment 104. In an embodiment, the transceiver 202 retrieves the first electronic media from the memory 110 of the first user equipment 102.

The transceiver 202 is further configured to provide or transmit the at least one first electronic media to the metadata generator unit 204. In an embodiment, the transceiver 202 is configured to provide only a portion of or the name of the first electronic media to the metadata generator unit 204. The metadata generator unit 204 is configured to read the first electronic media and the first set of electronic media stored on the first user equipment 102. The metadata generator unit 2014 may request for permission for reading the electronic media on the first user equipment 102. Such a request is sent to the transceiver 202 which receives the response to such request from the user, wherein the response may grant the access or deny the access to the first set of electronic media.

The metadata generator unit 204 is further configured to generate, by the first user equipment 102, at least one first electronic media metadata, wherein the at least one first electronic media metadata corresponds to the at least one first electronic media. The metadata generator unit 204 is also configured to generate the first set of electronic media metadata for the first set of electronic media stored at the first user equipment 102. As used herein, "metadata" refers to data or information pertaining to electronic media that provides additional information about the electronic media. Metadata includes name, author/artist, size, genre, file type or extension, file format, date of creation, tags or categories assigned to it, language, status, type of the electronic media such as audio, video, etc. For instance, if the first electronic media selected at the first user equipment 102 is an audio file, the metadata generated by the metadata generator unit 204 for said audio file may include the name of the file, the authors (singers) of the audio file, the name of the album to which the audio file belongs, the size of the audio file, the genre of music to which the audio file belongs, the file format of the audio file (such as mp3, mp4, etc.), language (such as English, Hindi, etc.).

The metadata generator unit 204 is configured to provide the generated first electronic media metadata and the first set of electronic media metadata to the repository 208 for storage. The metadata generator unit 204 is further configured to provide the generated first electronic media metadata to the recommendation unit 206.

The recommendation unit 206 is configured to scan the first set of electronic media stored on the first user equipment 102 and determine at least one first recommendation metadata based on an analysis of the at least one first electronic media metadata and the first set of electronic media metadata. The at least one first recommendation metadata corresponds to at least one of the first set of electronic media. The at least one first recommendation metadata is transferred to the second user equipment 104 using the transceiver 202.

The recommendation unit 206 is further configured to determine the at least one first recommendation metadata based on a profile of a first user associated with the first user equipment 102. Such profile information of the first user may be obtained by the recommendation unit 206 from the repository 208. In an embodiment, the recommendation unit 206 is also configured to determine the at least one first recommendation metadata based on a profile of a second user associated with the second user equipment 104, wherein the profile information of the second user is retrieved by the recommendation unit 206 from the repository or memory of the second user equipment 104 via the transceiver 202 (of the first user equipment).

As used herein, profile information of a user refers to the personal information of the user including but not limited to, user preferences, user's browsing history, type of data user exchanges with his peers, frequency of data shared, number of peers, usage statistics of the applications and data stored on the user's device, age, sex, location data, etc. For instance, profile includes information about the type of electronic media shared by users, including the most shared electronic media type. Such information can be used to deduce a user's affinity towards a particular type of electronic media. For example, if the user mostly shares music files with his peers more than any other type of files, this information is used to interpret that music related content such as advertisements, etc. should be recommended to the user. In another example, profile information includes frequency of electronic media shared by the user and this information can be used to recommend more amount of electronic media to the user or to recommend popular or trending electronic media to the user since he is an active user and is more likely to share or receive electronic media. In yet another example, profile information includes location information of the user that indicates the locations where the user is most active, i.e. the location in which the user mostly shares electronic media with other users, such as in a school, office, classroom, etc. This location information is used to prompt the user to start sharing information whenever the user equipment enters that location. In yet another example, profile information includes number of peers with whom users share information to determine the influence of the network of users which can be used to recommend promotional content to the active users.

In an embodiment, the recommendation unit 206 is configured to request for permission to access and scan the first set of electronic media on the first user equipment 102. Such a request is sent to the transceiver 202 which receives the response to such request from the user, wherein the response may grant the access or deny the access to the first set of electronic media. If the request for permission to access the first set of electronic media has already been granted by the user to the metadata generator 204, the recommendation unit 206 may or may not request for such access again.

The transceiver 202 is then configured to receive, by the first user equipment 102, at least one second recommendation metadata from the second user equipment 104 based on an analysis of the at least one first electronic media metadata and a second set of electronic media metadata. This second set of electronic media metadata corresponds to a second set of electronic media stored at the second user equipment 104, and the at least one second recommendation metadata corresponds to at least one of the second set of electronic media.

The invention encompasses a transceiver 202 that is further configured to receive, by the first user equipment 102, a selection for selecting at least one second recommendation metadata. The transceiver 202 transmits a request for receiving at least one of the second set of electronic media corresponding to said selected second recommendation metadata, and further receives said at least one of the second set of electronic media corresponding to said selected second recommendation metadata from the second user equipment 104. The transceiver 202 is then configured to provide the received at least one of the second set of electronic media corresponding to said selected second recommendation metadata to the repository 208 for storage.

The repository 208 is configured to store the first electronic media, the first set of electronic media, the first electronic media metadata, the first set of electronic media metadata, the first recommendation metadata, second recommendation metadata, second electronic media received from the second user equipment 104. The repository 208 is further configured to store any other data, information or electronic media as may be required for the functioning of the system 106 in accordance with the present invention.

Figure 3:
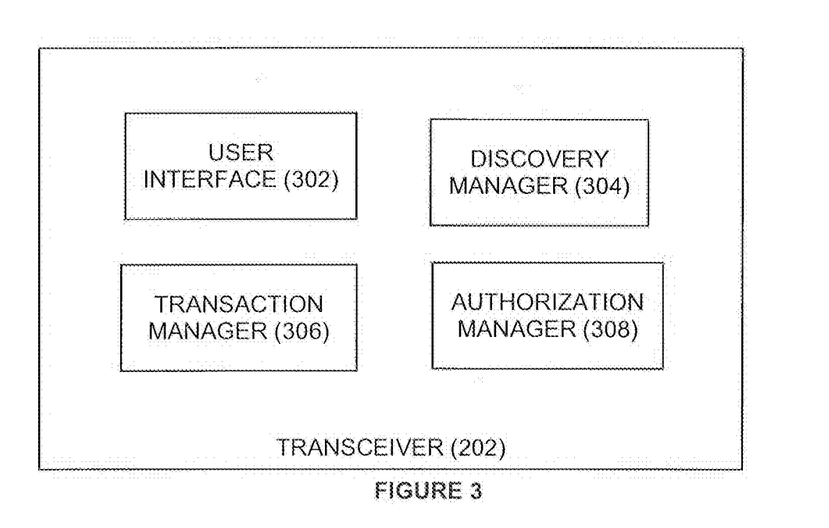
FIG. 3 illustrates a block diagram of the transceiver of the system for real-time multi-party recommendation in a peer to peer communication, in accordance with exemplary embodiments of the present disclosure.

FIG. 3 illustrates a block diagram of the transceiver of the system for real-time multi-party recommendation in a peer to peer communication, in accordance with exemplary embodiments of the present disclosure. As shown in FIG. 3, the transceiver 202 comprises of at least a user interface 302, a discovery manager 304, a transaction manager 306 and an authentication manager 308, wherein each of the said components are interconnected to each other.

The user interface 302 is configured to present one or more electronic media to the user of the first user equipment 102 and receive the selection of selecting at least one first electronic media from a first set of electronic media. The user interface 302 facilitates all interactions between the system 106 and the user of the first user equipment 102. The discovery manager 304 uses UDP/IP socket network libraries for discovering one or more user equipment on any interface such as WiFi, hotspot, Bluetooth, etc. The discovery manager 304 is configured to receive user equipment information from the discovered equipment, wherein the information includes device ID, model no., manufacture date/year, IMEDI, make, OS version, etc.

The transaction manager 306 uses TCP/IP socket network libraries for establishing a connection with the user equipment discovered by the discovery manager 304. The transaction manager 306 is further configured to send and receive data and electronic media over the sockets securely. The authentication manager 308 is configured to authenticate the connection request using the RSA keys and the AES keys. The authentication manager 308 receives the RSA public key from the second user equipment 104 with whom a connection has been established via the transaction manager 306. This received public key is then used by the authentication manager 308 to encrypt an AES key which is sent to the second user equipment 104 via the transaction manager 306. Thereafter, all requests, data and electronic media are encrypted using AES and sent to the second user equipment 104 via the transaction manager 306. The units, interfaces, modules, and components depicted in the figures and described herein may be present in the form of a hardware, a software and a combination thereof.

Figure 4:
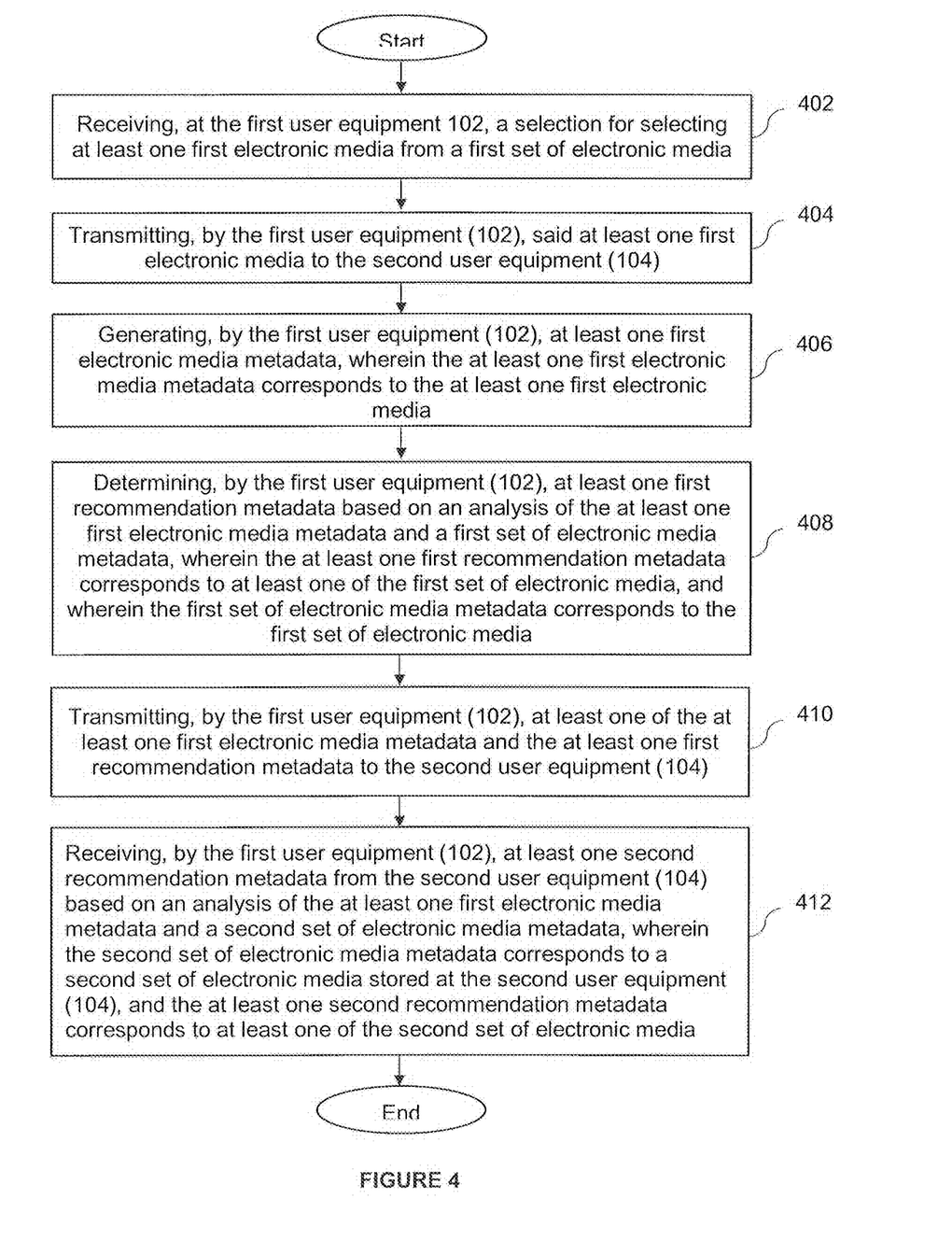
FIG. 4 illustrates a method for real-time multi-party recommendation in a peer to peer communication, in accordance with exemplary embodiments of the present disclosure.

FIG. 4 illustrates a method for real-time multi-party recommendation in a peer to peer communication, in accordance with exemplary embodiments of the present disclosure. As shown in FIG. 4, the method begins at step 402, wherein a selection for selecting at least one first electronic media from a first set of electronic media is received at the first user equipment 102. The at least one first electronic media and the first set of electronic media are stored in the first user equipment 102. This selection may be in the form of one or more commands or actions such as selecting/clicking/touching the share button of the electronic media, voice commands, text input, etc. In an embodiment, after receiving the selection, the discovery manager 304 discovers the available user equipment and provides a list of such discovered equipment to the user via the user interface 302. Next, the user interface 302 receives a selection of the second user equipment 104 with whom the user of the first user equipment wishes to share the selected first electronic media. Thereafter, the transaction manager 306 establishes a connection with the selected second user equipment 104 and the process proceeds to step 404.

In another embodiment, a request to transfer electronic media from a user of the first user equipment 102 is received at the user interface 302 of the first user equipment 102 prior to step 402. The requested electronic media may be photos, videos, music, call logs, contacts, calendar, documents, advertisements, etc. In such an embodiment, the request is analyzed to extract the information of the second user equipment 104 with whom the user of the first user equipment 102 wishes to share the first electronic media. This information is then used by the discovery manager 304 and the transaction manager 306 to discover and establish a connection with the second user equipment 104. Once the connection is established, the method proceeds to step 402 wherein selection for selecting the first electronic media from the first set of electronic media is received as discussed above. Thereafter, the process proceeds to step 404.

Figure 5:
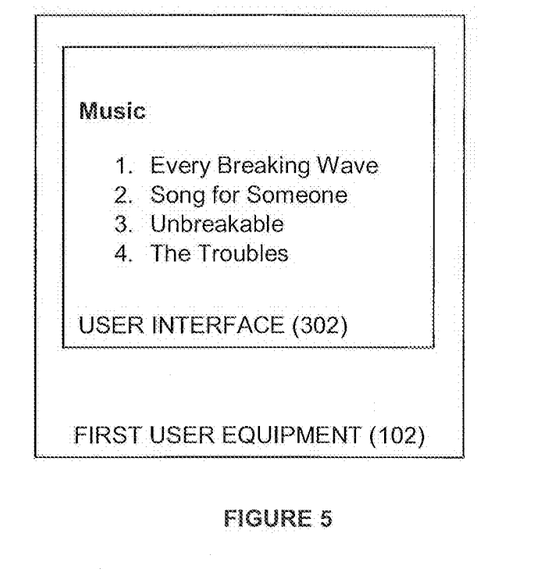
FIG. 5 illustrates an exemplary user interface diagram of the first user equipment depicting selection of at least one first electronic media, in accordance with exemplary embodiments of the present disclosure.

The selection received at step 402 includes a selection of the first electronic media from the first set of electronic media stored at the first user equipment 102. For instance, as shown in FIG. 5, a list of songs (i.e. the first set of electronic media) may be displayed at the user interface 302 of the first user equipment 102. The user may then select one song such as 'Unbreakable' from said first set of electronic media for the purpose of sharing with another user equipment. This may be done by the user tapping on the icon of the song 'Unbreakable'. This selection is shown in FIG. 5 using a dotted box, however, it may be appreciated that this is only for exemplary purposes. The invention encompasses receiving a selection of multiple electronic media to be transferred to the second user equipment 104, in which case all the selected electronic media are collectively referred to as the first electronic media.

At step 404, said at least one first electronic media is transmitted from the first user equipment 102 to the second user equipment 104. The transmission of the first electronic media may be performed over the connection established by the transaction manager 306. Subsequently, the method proceeds to step 406 wherein at least one first electronic media metadata is generated by the first user equipment 102. This at least one first electronic media metadata corresponds to the at least one first electronic media and provides additional information about the first electronic media. The invention encompasses generation of metadata by reading the header information of the first electronic media file and extracting information from said header. During the generation of the first electronic media metadata, the first electronic media file may be opened in the read-only mode to secure the integrity of the first electronic media. Alternatively, the header information may be read without opening the first electronic media. The invention also encompasses generation of metadata by the operating system of the first user equipment 102.

The invention encompasses checking if the first electronic media metadata is already stored in the repository 208 and retrieving the such metadata from the repository 208. In one embodiment, the method includes generation or retrieval of the first electronic media metadata before the transmission of the first electronic media from the first user equipment 102 to the second user equipment 104 is initiated. In another embodiment, the method includes generation or retrieval of the first electronic media metadata after the transmission of the first electronic media from the first user equipment 102 to the second user equipment 104 has been completed. In yet another embodiment, the method includes generation or retrieval of first electronic media metadata during the transmission of the first electronic media from the first user equipment 102 to the second user equipment 104, i.e. after initiation of transfer but before completion. The invention is capable of providing transmission of first electronic media simultaneously along with the generation of metadata, without affecting the speed of the transfer.

Referring to the example shown in FIG. 5, wherein a selection of the song 'Unbreakable' was received at the user interface 302. The metadata generated for this selected first electronic media may comprise the following:

TABLE 1

Metadata for the audio file 'Unbreakable'

| | |
|---|---|
| Artist | Jamie Scott |
| Album | My Hurricane |
| Release Date | 2015 |
| Genre | Pop |
| Length | 4:25 |
| Size | 4.05 MB |

It shall be appreciated by those skilled in the art that the above-mentioned metadata is only exemplary and may include lesser or more information. Further, generation of metadata for the first electronic media may also be dependent on the file type of the first electronic media. For instance, for an audio file the generated metadata may include both size and duration fields. However, for a text file the generated metadata may include size field but may not include the duration field.

At step 408, the method includes determining, by the first user equipment 102, at least one first recommendation metadata based on an analysis of the at least one first electronic media metadata and a first set of electronic media metadata. The at least one first recommendation metadata corresponds to at least one of the first set of electronic media, and the first set of electronic media metadata corresponds to the first set of electronic media. This first set of electronic media metadata is the metadata for the first set of electronic media stored at the first user equipment 102. The first set of electronic media metadata may be generated by the metadata generator 204 and stored in the repository 208, wherein generation of the first set of electronic media metadata may occur at the time of generation of the first electronic media metadata. Alternatively, the generation of the first set of electronic media metadata may occur before the method 400 is initiated. The invention also encompasses generation of the first set of electronic media metadata in parts or on the fly, i.e. as and when an electronic media is added to the first set of electronic media, the metadata for the same may be generated and stored in the repository 208 for future use.

By way of an example, the first set of electronic media metadata may include the following:

TABLE 2

| S. No. | File Name | Metadata | |
|---|---|---|---|
| 1 | Feels so good | Artist | Jamie Scott |
| | | Album | Feels so good |
| | | Release Date | 2017 |
| | | Genre | Pop |
| | | Length | 4:00 |
| | | Size | 4.7 MB |
| 2 | Thunder | Artist | Imagine Dragon |
| | | Album | Evolve |
| | | Release Date | 2017 |
| | | Genre | Rock |
| | | Length | 3:08 |
| | | Size | 3.7 MB |
| 3 | Not today | Artist | Imagine Dragon |
| | | Album | Evolve |
| | | Release Date | 2017 |
| | | Genre | Pop |
| | | Length | 4:19 |
| | | Size | 4.0 MB |

Determining the first recommendation media metadata includes scanning the first set of electronic media or the first set of electronic media metadata stored at the first user equipment 102. In an embodiment, scanning the first set of electronic media may include scanning of a subset of the first set of electronic media. The invention encompasses scanning the first set of electronic media once the user selects the first electronic media to be transmitted from the first user equipment 102 to the second user equipment 104 but before the selected first electronic media is transmitted. The invention also encompasses scanning the first set of electronic media after the first electronic media is transmitted from the first user equipment 102 to the second user equipment 104. The invention further encompasses scanning the first set of electronic media asynchronously in the background while transfer of the first electronic media is in progress, however, without affecting user experience and speed. The invention encompasses that scanning of the first user equipment 102 includes scanning of the OS file system of the first user equipment 102.

The analysis of the at least one first electronic media metadata and the first set of electronic media metadata may include comparing the first electronic media metadata with the first set of electronic media metadata to identify the overlap between the two. The analysis also includes applying one or more pre-defined rules to the result of this comparison to determine at least one first recommendation metadata. For instance, one of the rules may indicate that if the comparison of the first electronic media metadata and the metadata for an electronic media in the first set of electronic media metadata results in 20% overlap, only then the metadata for such electronic media is to be added to the recommendation metadata.

Referring again to the previous example where the selection of the song 'Unbreakable' is received at the first user equipment 102, the method then compares the first electronic media metadata shown in Table 1, with each of the entries in the first set of electronic media metadata as shown in Table 2. When the first electronic media metadata is compared to the first entry of the table 2, the method identifies that there is an overlap between the 'artist' and the 'genre' fields of the first electronic media metadata and the first entry of the first set of electronic media metadata. Similarly, when the first electronic media metadata is compared to the second entry of the table 2, the method identifies no overlap, however, with the third entry the method identifies an overlap in the 'genre' field. Therefore, in this example, the first recommendation metadata includes the metadata for the songs 'Feels so good' and 'Not today', as shown in Table 3 below.

TABLE 3

| S. No. | File Name | Metadata | |
|---|---|---|---|
| 1 | Feels so good | Artist | Jamie Scott |
| | | Album | Feels so good |
| | | Release Date | 2017 |
| | | Genre | Pop |
| | | Length | 4:00 |
| | | Size | 4.7 MB |
| 2 | Not today | Artist | Imagine Dragon |
| | | Album | Evolve |
| | | Release Date | 2017 |
| | | Genre | Pop |
| | | Length | 4:19 |
| | | Size | 4.0 MB |

The invention also encompasses scoring the at least one first recommendation metadata based on one or more scoring rules, wherein a high score indicates the higher overlap between the first electronic media metadata and the metadata of another electronic media from the first set of electronic media. The invention further includes sorting the recommendation metadata in order of highest to lowest score before providing the same to the user via the user interface 302 of the first user equipment 102. For instance, in the above example, the song 'Feels so good' is given a higher score compared to the song 'Not today' since there is greater overlap between the first electronic media 'Unbreakable' and the song 'Feels so good'.

The invention further encompasses determining the at least one first recommendation metadata based on a profile of a first user associated with the first user equipment 102. This includes retrieving the user profile information of the first user from the repository 208 or the memory 110, and applying one or more pre-defined profile rules to determine the at least one first recommendation metadata. For instance, one of the user profile rules may indicate that if the user profile mentions that the preferred language of the user is Hindi, the recommendation metadata may include metadata corresponding to electronic media stored in Hindi language. Similarly, another rule may indicate that if the user profile mentions that the user has recently browsed songs from a particular singer/artist, then recommendation metadata should include metadata corresponding to an electronic media of that artist.

At step 410, the at least one first electronic media metadata and the at least one first recommendation metadata is transmitted from the first user equipment 102 to the second user equipment 104. The user of the second user equipment 104 therefore, becomes aware of other electronic media stored at the first user equipment 102 that is similar to the first electronic media received/being received at the second user equipment 104. This recommendation occurs without any manual intervention from the first or the second user and therefore, is a more efficient and time saving process as compared to the manual process of the prior art where the users had to manually search through the content stored on each other's devices and select the content they wish to transfer. The invention also provides for recommendation of electronic media at the first user equipment 102 out of the electronic media stored at the second user equipment 104 in the connectivity of the first user equipment 102, based on the profile/liking of the first user and without the manual intervention of the first and the second user. Further, it is advantageous to share the recommendation metadata first since metadata is smaller in size when compared to the actual recommended content from the first set of electronic media. In one embodiment, the first electronic media metadata is transmitted from the first user equipment 102 to the second user equipment 104, along with the first electronic media.

Subsequently, at step 412, at least one second recommendation metadata is received from the second user equipment 104. Second recommendation metadata is based on an analysis of the at least one first electronic media metadata and second set of electronic media metadata, wherein the second set of electronic media metadata corresponds to a second set of electronic media stored at the second user equipment, and the at least one second recommendation metadata corresponds to at least one of the second set of electronic media. This analysis of the at least one first electronic media metadata and second set of electronic media metadata occurs at the second user equipment 104.

In an embodiment, this second recommendation metadata is received after the complete transmission of the first electronic media. In another embodiment, the second recommendation metadata is received during the transfer of the first electronic media from the first user equipment 102 to the second user equipment 104. The invention encompasses determining the at least one second recommendation metadata based on a profile of a second user associated with the second user equipment 104, wherein the second recommendation metadata is determined based on one or more pre-defined profile rules as discussed with reference to the determination of first recommendation metadata.

Figure 6:
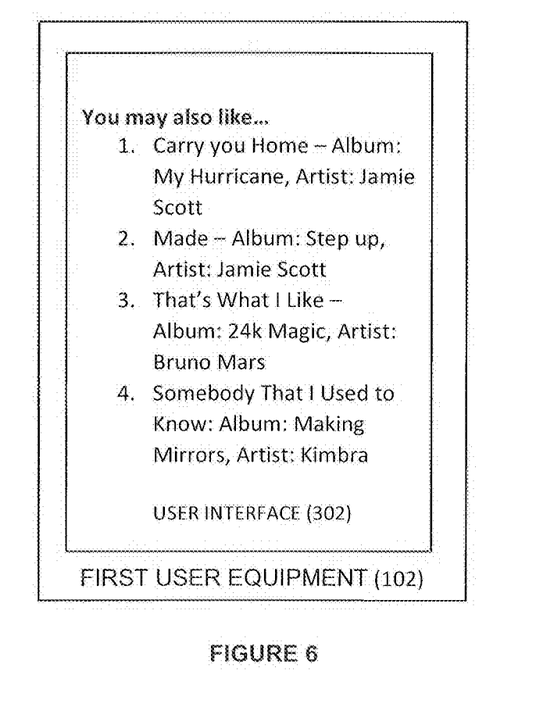
FIG. 6 illustrates an exemplary user interface diagram of the first user equipment depicting second recommendation metadata received from the first user equipment, in accordance with exemplary embodiments of the present disclosure.

FIG. 6 shows an exemplary second recommendation metadata received at the user interface 302 of the first user equipment 102. As shown, the metadata comprises of a list of songs from the same Artist, i.e. Jamie Scott, and some songs from the same genre, i.e. Pop, as of the selected first electronic media 'Unbreakable'. As shown, the user interface 302 provides an option to select one or more of the second recommended metadata from the second electronic device 104. The user of the first user equipment 102 therefore, becomes aware of other electronic media stored at the second user equipment 104 that is similar to the first electronic media transmitted/being transmitted to the first user equipment 102. This recommendation occurs without any manual intervention from the first or the second user and therefore, is a more efficient and time saving process as compared to the manual process of the prior art where the users had to manually search through the content stored on each other's devices and select the content they wish to transfer.

After step 412, the method ends. This method therefore provides recommendation of electronic media, based on the electronic media that the user of the first user equipment 102 intends to share with the user of the second user equipment 104. Such a recommendation by the method and system of the present invention is provided to the first user without any manual intervention from the second user. Therefore, the present invention enables a high rate of user satisfaction and also makes accessing the desired electronic media stored on another user equipment, easy convenient and instantaneous.

The present invention encompasses that after the first recommendation metadata is transmitted to the second user equipment 104 and the second recommendation metadata is transmitted to the first user equipment 102, the first user equipment 102 at the user interface 302 receives a selection for selecting at least one second recommendation metadata. Subsequently, a request for receiving at least one of the second set of electronic media corresponding to said selected second recommendation metadata is transmitted by the first user equipment 102 to the second user equipment 104. Such at least one of the second set of electronic media corresponding to said selected second recommendation metadata is then received at the first user equipment 102 from the second user equipment 104. Similar process is also enabled at the second user equipment 104 wherein the second user equipment 104 can request at least one of the first set of electronic media stored at the first user equipment 102 corresponding to at least one of the first recommendation metadata.

The invention also encompasses storing the recommendation history in the user equipment. For instance, the first user equipment 102 may be configured to store a list of all recommendations made in accordance with the present invention to the second user equipment 104. Similarly, the first user equipment 102 may also be configured to store a list of recommendations received from the second user equipment 104. These lists may be stored at the first user equipment 102 and/or the second user equipment 104, in the form a recommendation history between the first user equipment 102 and the second user equipment 104. In addition to this, the first user equipment 102 may be configured to store whether the recommendation was accepted or declined by the second user device 104. Similarly, the second user equipment 104 is configured to store whether the second recommendation metadata was accepted or declined by the user of the first user equipment 102. This data may be stored at the first user equipment 102 and the second user equipment 104 in the form of transfer history between the first user equipment 102 and the second user equipment 104.

The invention encompasses analyzing the recommendation history and the transfer history to shortlist or sort the first/second recommendation metadata. For instance, when first recommendation metadata is determined by the first user equipment 102, said first recommendation metadata is compared to the recommendation history and the transfer history between the first user equipment 102 and the second user equipment 104. In case it is determined that one or more of the electronic media in the first recommendation metadata has already been previously recommended to the second user equipment 104 or has already been transferred to the second user equipment 104, then such one or more electronic media in the first recommendation metadata are removed from the first recommendation metadata or the score of such one or more electronic media are altered/reduced. Since these one or more items in the first recommendation metadata have already been transferred or recommended to the second user equipment 104, it is less likely that the second user equipment 104 would prefer to receive such electronic media once again. The present invention therefore, enables selection and transfer of content with non-repetitive recommendations.

While considerable emphasis has been placed herein on the disclosed embodiments, it will be appreciated that changes can be made to the embodiments without departing from the principles of the present invention. These and other changes in the embodiments of the present invention shall be within the scope of the present invention and it is to be understood that the foregoing descriptive matter is illustrative and non-limiting.

We claim:

1. A method for real-time multi-party recommendation in a peer to peer communication, the method comprising:
  receiving, at a first user equipment, a selection for selecting at least one first electronic media from a first set of electronic media, wherein the at least one first electronic media and the first set of electronic media are stored in the first user equipment;
  transmitting, by the first user equipment, the at least one first electronic media to a second authenticated user equipment, wherein the first user equipment authenticates the second authenticated user equipment;
  after transmitting the at least one first electronic media to the second authenticated user equipment, generating, by the first user equipment, at least one first electronic media metadata, wherein
  the at least one first electronic media metadata corresponds to the at least one first electronic media;
  determining, by the first user equipment, at least one first recommendation metadata based on an analysis of the at least one first electronic media metadata and a first set of electronic media metadata, wherein the analysis includes comparing the at least one first electronic media metadata and the first set of electronic media metadata to identify an overlap between the at least one first electronic media metadata and the first set of electronic media metadata, wherein the at least one first recommendation metadata is determined if the overlap satisfies a predefined rule;
  transmitting, by the first user equipment, at least one of the at least one first electronic media metadata and the at least one first recommendation metadata to the second authenticated user equipment; and
  receiving, by the first user equipment, at least one second recommendation metadata from the second authenticated user equipment based on an analysis of the at least one first electronic media metadata and a second set of electronic media metadata, wherein the second set of electronic media metadata corresponds to a second set of electronic media stored at the second authenticated user equipment, and the at least one second recommendation metadata corresponds to at least one of the second set of electronic media.

2. The method as claimed in claim 1, further comprising, determining the at least one first recommendation metadata based on a profile of a first user associated with the first user equipment.

3. The method as claimed in claim 1, further comprising, determining the at least one second recommendation metadata based on a profile of a second authenticated user associated with the second authenticated user equipment.

4. The method of claim 1, further comprising generating, at the first user equipment, the first set of electronic media metadata.

5. The method as claimed in claim 1 further comprising:
  receiving, at the first user equipment, a selection for selecting at least one second recommendation metadata;
  transmitting, by the first user equipment, a request for receiving at least one of the second set of electronic media corresponding to the selected second recommendation metadata; and
  receiving, at the first user equipment, the at least one of the second set of electronic media corresponding to the selected second recommendation metadata.

6. The method as claimed in claim 1, wherein the at least one first electronic media, the first set of electronic media, and the second set of electronic media include at least one of a previously shared video file, an audio file, a text file, an image file, a text message, an instant message, at least one call log, at least one contact, and at least one calendar data.

7. The method as claimed in claim 1, wherein the at least one first electronic media metadata, the first set of electronic media metadata, the at least one first recommendation metadata, the at least one second recommendation metadata, and the second set of electronic media metadata include at least one of a name, at least one author, a size, a genre, an extension, a date, and a type of the at least one electronic media.

8. The method of claim 1, wherein the determining by the first user equipment of the at least one first recommendation metadata comprises scoring the at least one first electronic media metadata of the at least one first electronic media previously sent to the second authenticated user equipment from the first user equipment and the metadata of another electronic media from the first set of electronic media and sorting the first recommendation metadata in order of highest to lowest score.

9. A system for real-time multi-party recommendation in a peer to peer communication, the system comprising:
  a transceiver configured to
  receive, by a first user equipment, a selection for selecting at least one first electronic media from a first set of electronic media, wherein the at least one first electronic media and the first set of electronic media are stored in the first user equipment, and transmit, by the first user equipment, the at least one first electronic media to a second authenticated user equipment wherein the first user equipment authenticates the second authenticated user equipment;

after transmitting the at least one first electronic media to the second authenticated user equipment, a metadata generator unit configured to generate, by the first user equipment, at least one first electronic media metadata, wherein the at least one first electronic media metadata corresponds to the at least one first electronic media;

a recommendation unit configured to determine, by the first user equipment, at least one first recommendation metadata based on an analysis of the at least one first electronic media metadata and a first set of electronic media metadata, wherein the analysis includes comparing the at least one first electronic metadata and the first set of electronic media metadata to identify an overlap between the at least one first electronic media metadata and the first set of electronic media metadata, wherein the at least one first recommendation metadata is determined if the overlap satisfies a predefined rule; and wherein, the transceiver is configured to transmit, by the first user equipment, at least one of the at least one first electronic media metadata and the at least one first recommendation metadata to the second authenticated user equipment, and the transceiver is further configured to receive, by the first user equipment, at least one second recommendation metadata from the second authenticated user equipment based on an analysis of the at least one first electronic media metadata and a second set of electronic media metadata, wherein the second set of electronic media metadata corresponds to a second set of electronic media stored at the second authenticate user equipment, and the at least one second recommendation metadata corresponds to at least one of the second set of electronic media.

10. The system as claimed in claim 9, wherein the metadata generator unit is further configured to generate, by the first user equipment, the first set of electronic media metadata.

11. The system as claimed in claim 9 wherein the transceiver is further configured to:

receive, by the first user equipment, a selection for selecting at least one second recommendation metadata;

transmit, by the first user equipment, a request for receiving at least one of the second set of electronic media corresponding to the selected second recommendation metadata; and receiving, by the first user equipment, the at least one of the second set of electronic media corresponding to the selected second recommendation metadata.

* * * * *